(12) United States Patent  (10) Patent No.: US 7,934,315 B2
Milleville  (45) Date of Patent: May 3, 2011

(54) METHOD OF REPAIRING SHROUDED TURBINE BLADES WITH CRACKS IN THE VICINITY OF THE OUTER SHROUD NOTCH

(75) Inventor: Timothy A. Milleville, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 1300 days.

(21) Appl. No.: 11/503,325

(22) Filed: Aug. 11, 2006

(65) Prior Publication Data

US 2008/0047138 A1 Feb. 28, 2008

(51) Int. Cl.
*B23P 6/00* (2006.01)
(52) U.S. Cl. ...... 29/889.1; 29/889.2; 29/889.7; 29/402.09; 29/402.11; 148/527; 228/19; 228/262.31; 416/177; 416/189; 416/191
(58) Field of Classification Search .......... 29/889.1, 29/889.2, 889.01, 889.7, 402.09, 402.11, 29/890.01; 228/19, 262.31; 416/177, 189, 191; 148/518, 527, 528
See application file for complete search history.

(56) References Cited

U.S. PATENT DOCUMENTS 4,176,433 A * 12/1979 Lee et al. ............ 29/889.1
6,164,916 A * 12/2000 Frost et al. .......... 416/189
6,568,077 B1 * 5/2003 Hellemann et al. ...... 29/889.1

* cited by examiner

*Primary Examiner* — Rick K Chang
(74) *Attorney, Agent, or Firm* — Kinney & Lange, P.A.

(57) ABSTRACT

A method of repairing a damaged notch fillet radius of a turbine blade shroud includes a replacement notch fillet radius and a hardface nugget. The damaged notch fillet radius is blended out and a hardface structure positioned proximate the damaged notch fillet radius is removed. A replacement notch fillet radius is formed with weld filler and the hardface nugget is welded to at least a portion of the replacement notch fillet radius.

14 Claims, 5 Drawing Sheets

METHOD OF REPAIRING SHROUDED TURBINE BLADES WITH CRACKS IN THE VICINITY OF THE OUTER SHROUD NOTCH

BACKGROUND OF THE INVENTION

The present invention generally relates to the field of repairing shrouded turbine blades. In particular, the invention relates to a method of repairing a notch fillet radius of a shrouded turbine blade.

Shrouded turbine blades are often exposed to extreme environments, such as high temperatures and strong vibrations in aircraft engines. In order to withstand such environments, shrouded turbine blades are typically formed of a nickel-based alloy. Additionally, shrouded turbine blades typically include a hardface structure within a notch fillet radius that dissipates the vibrational forces from the surrounding environment. Although the shrouded turbine blade may be wear resistant, the stresses imparted on the shrouded turbine blade and its parts can cause cracks in the weaker areas of the shrouded turbine blade. For example, the notch fillet radius of the shrouded turbine blade can easily form cracks radiating inward from the edge of the notch fillet radius. If left unattended, the heat and vibrational stresses of the environment may cause the crack to continue to extend inward and cause the shrouded turbine blade to break.

One problem with repairing a crack located at an outer edge of the notch fillet radius is that the hardface structure is typically formed of a brittle material, such as a cobalt-based alloy. This is in contrast to the softer nickel-based alloy forming the shrouded turbine blade. Thus, traditional repair techniques are limited to blending techniques to remove the damaged area. Most of these current repair techniques can only repair the notch fillet radius of the shrouded turbine blade if the crack is no more than approximately 0.03 inches deep inward from the outer edge of the notch fillet radius. If the depth of the crack is greater than approximately 0.03 inches, the entire shrouded turbine blade must typically be replaced. This can be a costly process, particularly if there is only a single crack or if only a small percentage of the shrouded turbine blade is damaged. Therefore, it would be desirable to have methods that allow cracks greater than approximately 0.03 inches deep in the notch fillet radius of shrouded turbine blades to be repaired so that more parts could be salvaged.

BRIEF SUMMARY OF THE INVENTION

Methods of repairing a damaged notch fillet radius of a turbine blade shroud are described. The damaged notch fillet radius is blended out and a hardface structure positioned proximate the damaged notch fillet radius is removed. A replacement notch fillet radius is formed with weld filler and a hardface nugget is welded to at least a portion of the replacement notch fillet radius. Conventional techniques are then used to return the blade to serviceable condition. These methods allow cracks up to approximately 0.1 inches deep to be repaired.

DETAILED DESCRIPTION

The new methods of repairing damaged shrouds of turbine blades described herein allow cracks having a depth of up to approximately 0.1 inches to be repaired. The cracks are located at a notch fillet radius of the shroud, radiating inward from an outer edge of the shroud. The crack and the damaged area around the crack are first blended out locally. A hardface structure of the shroud is then either machined or ground off. A replacement weld is then formed at the notch fillet radius where the crack was removed. After the replacement weld is formed on the shroud, the surface is prepared to accept a hardface nugget. The hardface nugget is then welded to the shroud and the replacement weld at the same location where the hardface structure was located. Conventional methods are then used to place the turbine blade in serviceable condition.

Figure 1:
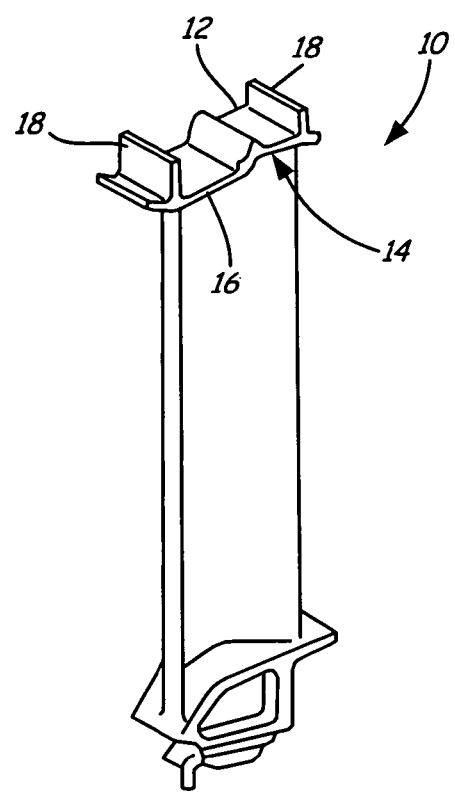
FIG. 1 is a perspective view of a turbine blade.
Figure 2:
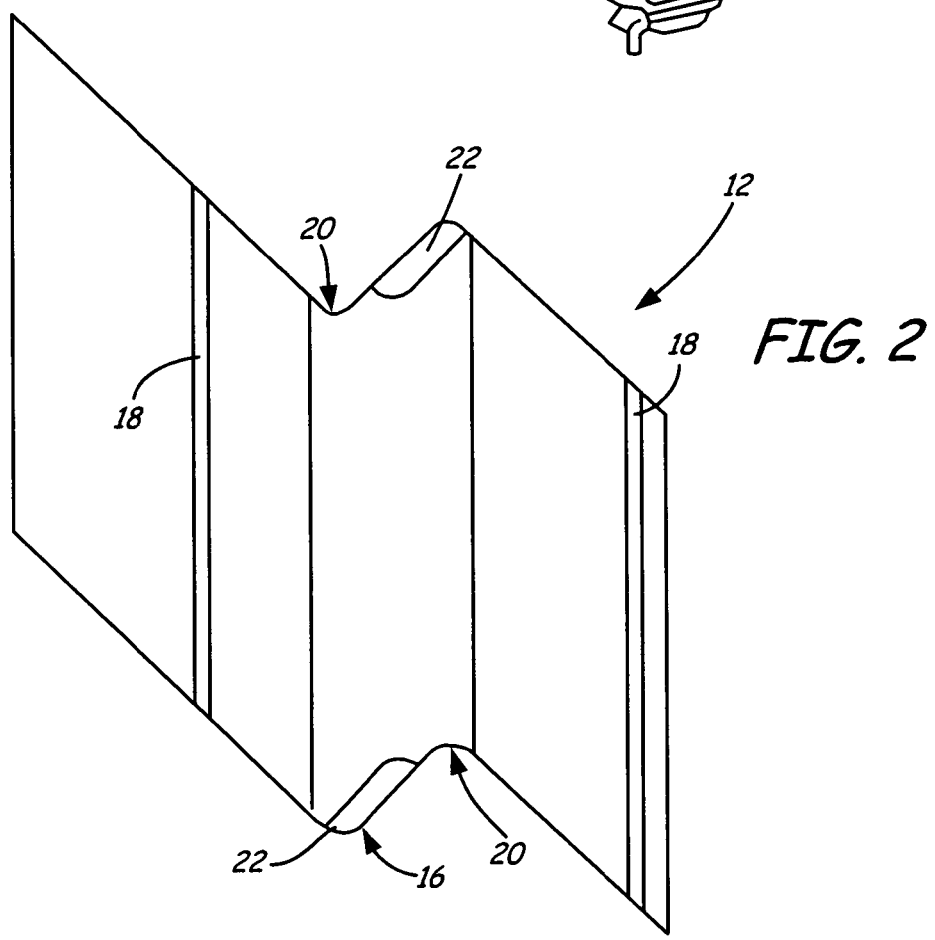
FIG. 2 is an enlarged top view of a shroud of the turbine blade.

FIGS. 1 and 2 show a perspective view of turbine blade 10 and a top view of shroud 12 of turbine blade 10, respectively, and will be discussed in conjunction with one another. Turbine blade 10 generally includes shroud 12 positioned at a top end 14 of turbine blade 10. Shroud 12 has an original edge 16 and generally includes air seals 18, notch fillet radius 20, and hardface structures 22. Notch fillet radius 20 is formed at original edge 16 of shroud 12. Hardface structure 22 is welded to original edge 16 adjacent notch fillet radius 20 and functions to dissipate the vibration energy when hardface structure 22 rubs against adjacent blade hardfaces. In operation, the shrouds of adjacent turbine blades are positioned next to each other such that each notch fillet radius 20 of shroud 12 abuts a hardface structure of an adjacent shroud on either side of shroud 12. Turbine blade 10 is exposed to high temperatures and vibratory stresses present in jet turbine engines with loads constantly exerted on original edge 16 of shroud 12, and particularly notch fillet radius 20. Thus, notch fillet radius 20 and the area proximate notch fillet radius 20 can crack, with the crack typically radiating inward. Whereas current repair techniques only allow cracks of up to approximately 0.03 inches deep to be repaired, the new methods of repairing cracks described herein allow cracks up to approximately 0.1 inches deep to be repaired. This allows many parts to be repaired instead of being scrapped.

Figure 3:
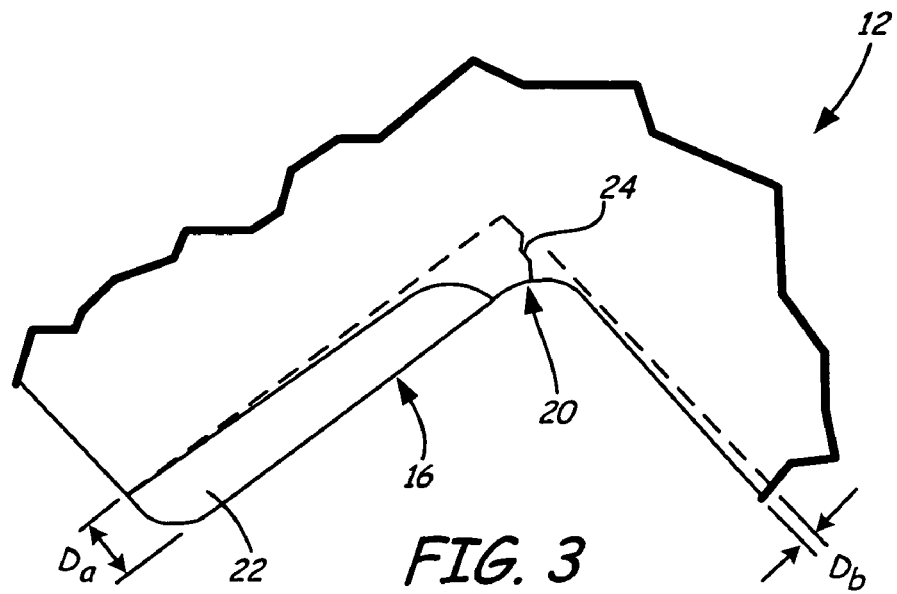
FIG. 3 is an enlarged view of a crack located at a notch fillet radius of the turbine blade.

FIG. 3 shows an enlarged view of original edge 16, notch fillet radius 20, and hardface structure 22 of shroud 12. Original edge 16 forms the outer perimeter of shroud 12. Notch fillet radius 20 has crack 24 radiating from original edge 16 of shroud 12. Crack 24 is caused by the high temperature and vibration stressed environment in which shroud 12 is located. Crack 24 has a height of depth $D_a$ and a width of depth $D_b$. When depth $D_a$ of crack reaches approximately 0.03 inches as measured from edge 16, shroud 12 can no longer be adequately repaired by conventional blending, or grinding, methods. Cracks with depth $D_a$ of up to approximately 0.1 inches can be repaired using the following repair method.

Figure 4:
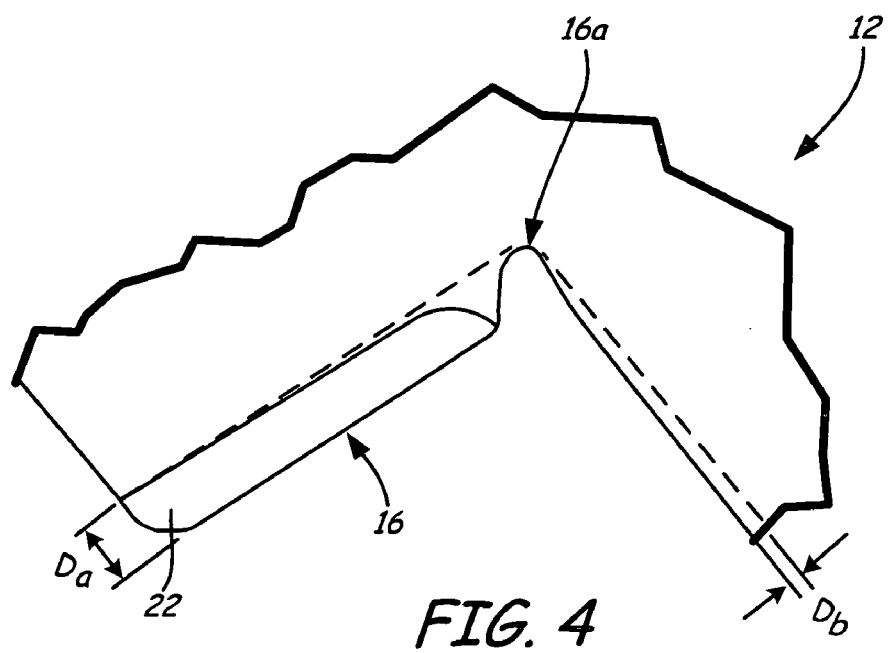
FIG. 4 is an enlarged view of the notch fillet radius with the crack removed.

FIG. 4 shows an enlarged view of original edge 16 and hardface structure 22 after crack 24 (shown in FIG. 3) has been removed from shroud 12. In order to repair shroud 12 back to serviceable condition, crack 24 must be completely removed from shroud 12. Crack 24 and the area proximate crack 24 to a height of at least depth $D_a$ and a width of at least depth $D_b$ are thus blended out such that notch fillet radius 20 (shown in FIG. 3) is substantially removed from shroud 12. A portion of original edge 16 is removed from shroud 12 proximate notch fillet radius 20, forming new edge 16a at notch fillet radius 20. Crack 24 and the area proximate crack 24 may be removed by blending, grinding, machining, or any other method known in the art. Original edge 16 may be blended out from shroud 12 either normally with respect to a plane of shroud 12 or at an angle with respect to shroud 12 in order to create a greater surface area to which replacement parts may be welded.

Figure 5:
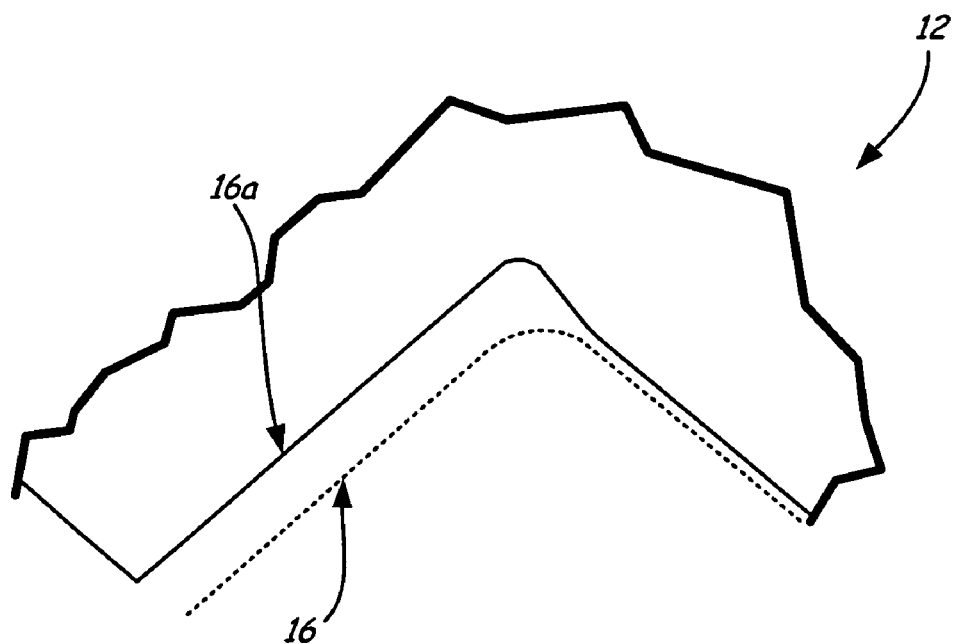
FIG. 5 is an enlarged view of the notch fillet radius with a hardface structure of the turbine blade removed.

FIG. 5 shows an enlarged view of new edge 16a after notch fillet radius 20 and hardface structure 22 have been removed from shroud 12. After crack 24 (shown in FIG. 3) and the area proximate crack 24 have been blended out from shroud 12, hardface structure 22 (shown in FIG. 4) is also removed from shroud 12. Hardface structure 22 may be removed in any suitable manner, such as by machining or grinding hardface structure 22 from shroud 22. Removal of crack 24, the area proximate crack 24, and hardface structure 22 essentially entirely eliminates original edge 16 (shown in FIG. 3) and forms new edge 16a as the new perimeter of shroud 12.

Figure 6:
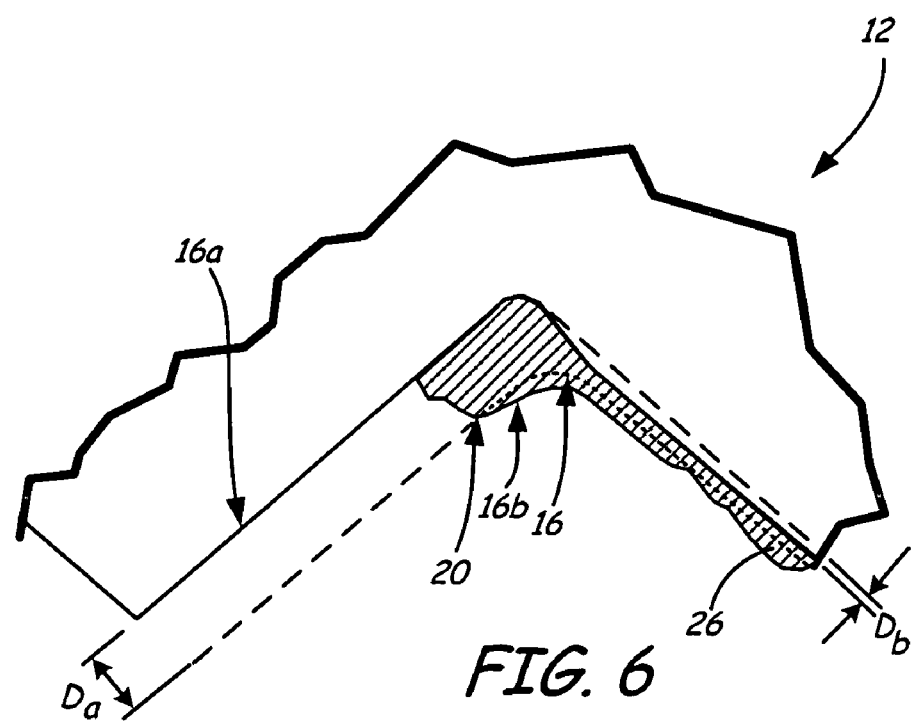
FIG. 6 is an enlarged view of the notch fillet radius with a replacement weld.

FIG. 6 shows an enlarged view of new edge 16a and notch fillet radius 20 with replacement weld 26. Once crack 24 and hardface structure 22 (shown in FIG. 3) have been removed from shroud 12, replacement weld 26 is formed with a weld filler along a portion of new edge 16a. Replacement weld 26 is formed to fill in the notch fillet radius removed by blending out crack 24 and has a height of at least depth $D_a$ and a width of at least depth $D_b$. Replacement weld 26 thus takes the shape of notch fillet radius 20 that was previously removed and extends new replacement weld edge 16b back to at least original edge 16 at notch fillet radius 20. While any suitable weld filler material may be used, in one embodiment, a suitable weld filler is a nickel-based alloy known as Inconel 625, available from International Nickel, Inc., Saddle Brook, N.J.

Figure 7:
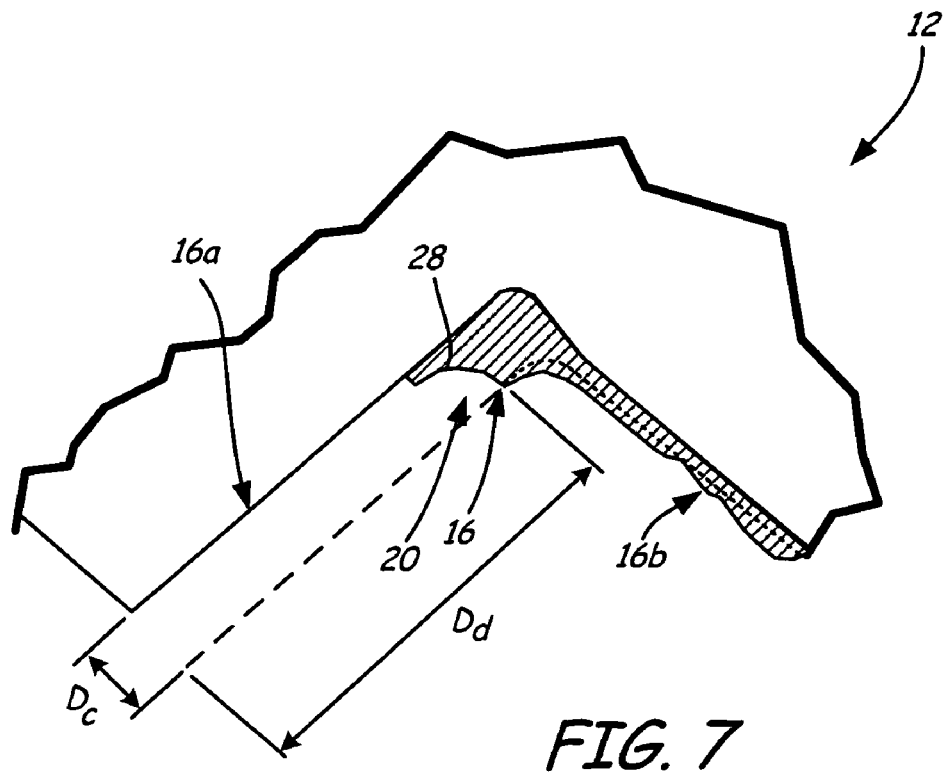
FIG. 7 is an enlarged view of the notch fillet radius with the replacement weld shaped to accept a hardface nugget.
Figure 8:
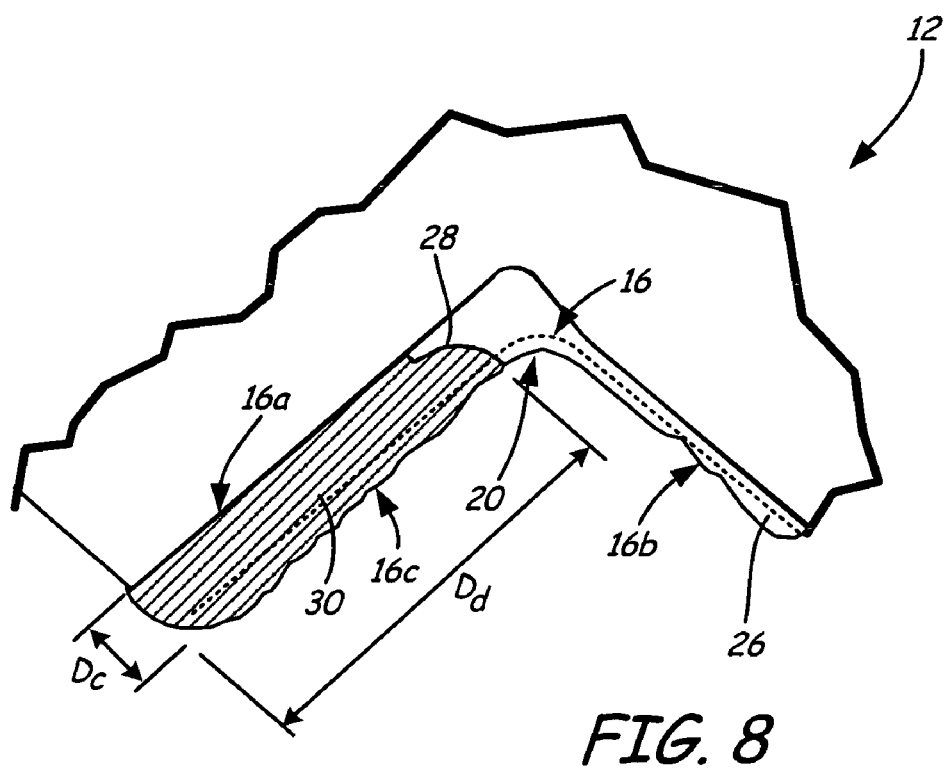
FIG. 8 is an enlarged view of the notch fillet radius with the hardface nugget.

FIG. 7 shows an enlarged view of original edge 16, new replacement weld edge 16b, and notch fillet radius 20 with an edge portion 28 of replacement weld 26 shaped to accept a hardface nugget 30 (shown in FIG. 8). Prior to welding hardface nugget 30 onto shroud 12, edge portion 28 of replacement weld 26 must be shaped to accept hardface nugget 30. Because hardface structure 22 (shown in FIG. 4) had a height of depth $D_c$ and a width of depth $D_d$, edge portion 28 or replacement weld 26 and new replacement weld edge 16b must be shaped to a height of at least depth $D_c$ and a width of at least depth $D_d$ from new edge 16a to properly prepare edge portion 28 and new edge 16a to accept hardface nugget 30. Edge portion 28 of replacement weld 26 may be properly shaped to accept hardface nugget 30 by machining or any other suitable manner.

FIG. 8 shows an enlarged view of new replacement weld edge 16b, new hardface nugget edge 16c, and notch fillet radius 20 with hardface nugget 30 welded to shroud 12 and replacement weld 26. Hardface nugget 30 has substantially the same shape as hardface structure 22 (shown in FIG. 3) with a height of at least depth $D_c$ and a width of at least depth $D_d$. Hardface nugget 30 is welded onto shroud 12 at new edge 16a and shaped edge portion 28 of replacement weld 26. Welding hardface nugget 30 to shroud 12 extends the remaining portion of new hardface nugget edge 16c back to at least original edge 16. In one embodiment, hardface nugget 30 is welded to shroud 12 by gas tungsten welding at between approximately 10 amps and approximately 25 amps, but any suitable welding technique may be used. After hardface nugget 30 has been welded onto shroud 12, conventional notch repair procedures may be used to restore hardface nugget 30 and surrounding areas (i.e., replacement weld 26) to serviceable condition. Examples of suitable conventional notch repair procedures include, but are not limited to: grinding, degreasing, stress-relieving, and shot peening.

Figure 9:
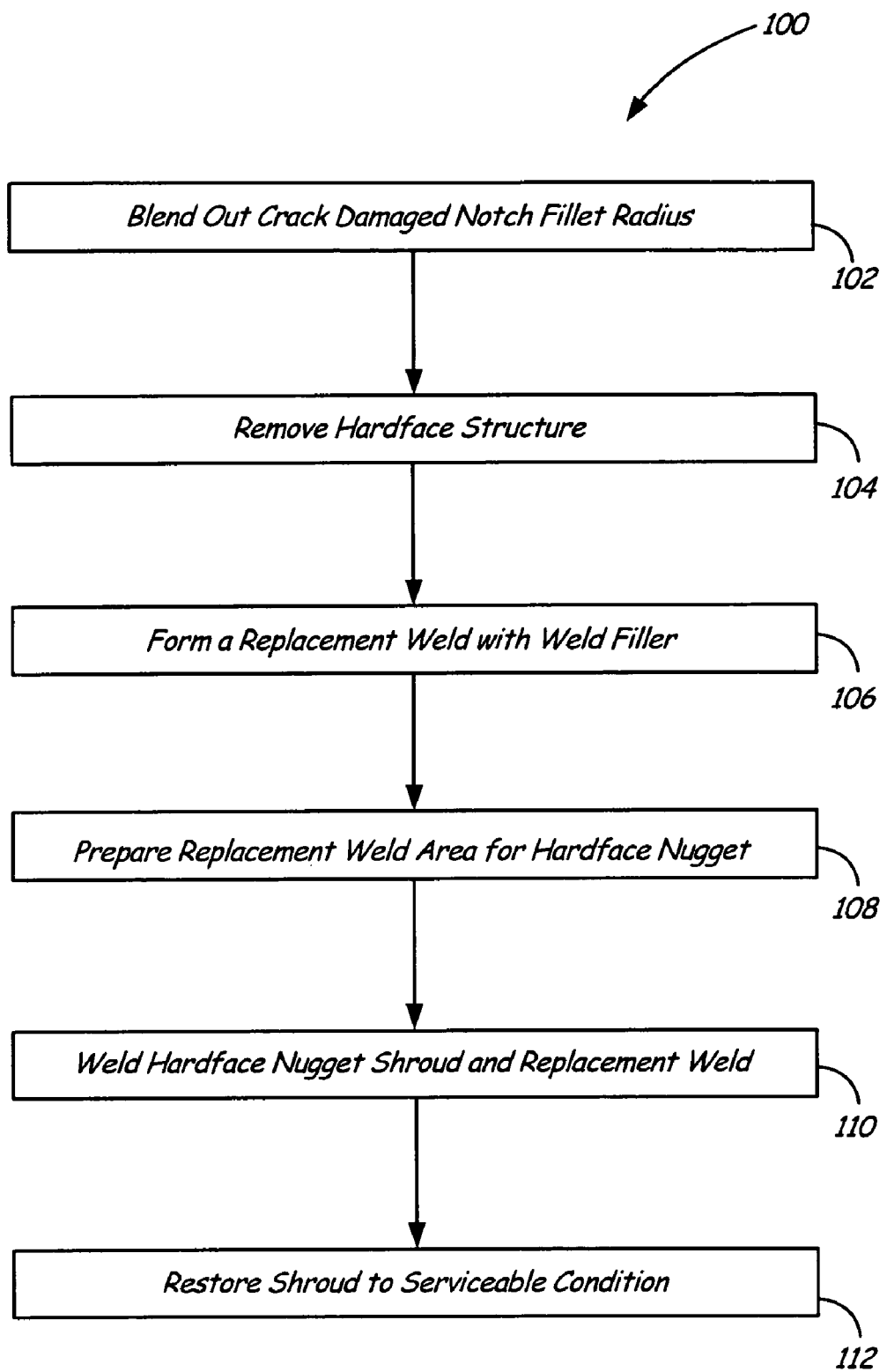
FIG. 9 is a block diagram of a method of repairing a damage site of a notch fillet radius of a turbine blade.

FIG. 9 shows a block diagram of an exemplary, non-limiting method 100 of repairing shroud 12 with crack 24 located at notch fillet radius 20. Conventional blending techniques can repair cracks only up to a depth of approximately 0.03 inches. Method 100 allows the repair of cracks having a depth of up to approximately 0.1 inches. Conventional blending techniques can repair cracks only up to a depth of approximately 0.03 inches. As shown in Box 102, crack 24 and the surrounding damaged area of notch fillet radius 20 are blended out locally. Hardface structure 22 is then either machined or ground off of shroud 12, as represented by Box 104. As described in Box 106, replacement weld 26 is formed at new edge 16a and notch fillet radius 20 with a weld filler to fill in the area previously removed in Box 102. After replacement weld 26 has been formed on shroud 12, shroud 12 is prepared to accept hardface nugget 30 by machining edge portion 28 of replacement weld 26, as represented by Box 108. Hardface nugget 30 is welded to shroud 12 and replacement weld 26 at the same location that hardface structure 22 was located, as represented by Box 110. As depicted in Box 112, after hardface nugget 30 has been welded onto shroud 12, shroud 12 is restored to serviceable condition using conventional notch repair procedures, which can include, for example: grinding, degreasing, stress-relieving, shot peening, and the like.

Although the present invention has been described with reference to preferred embodiments, workers skilled in the art will recognize that changes may be made in form and detail without departing from the spirit and scope of the invention.

The invention claimed is:

1. A method of repairing a damaged notch fillet radius of a turbine blade shroud, the method comprising:
    blending out the damaged notch fillet radius, wherein the damaged notch fillet radius has a depth greater than about 0.03 inches from an edge of the notch fillet radius and a maximum depth of about 0.1 inches from the edge of the notch fillet radius;
    removing a hardface structure positioned proximate the damaged notch fillet radius;
    forming a replacement notch fillet radius with weld filler comprising a first material; and
    welding a hardface nugget comprising a second different material to at least a portion of the replacement notch fillet radius.

2. The method of claim 1, wherein the welding the hardface nugget comprises gas tungsten arc welding.

3. The method of claim 1, wherein the welding the hardface nugget comprises welding at a power of between about 10 amps and about 25 amps.

4. The method of claim 1, wherein the first material is a nickel-based alloy.

5. The method of claim 4, wherein the nickel-based alloy comprises Inconel-625.

6. The method of claim 1, further comprising:
    preparing the replacement notch fillet radius for the hardface nugget prior to the welding step.

7. The method of claim 6, wherein preparing the preparing the replacement notch fillet radius for the hardface nugget comprises shaping the replacement notch fillet radius to accept the hardface nugget.

8. A method of repairing a damaged notch fillet radius of a turbine blade shroud, the method comprising:
- blending out the damaged notch fillet radius, wherein the damaged notch fillet radius has a depth greater than about 0.03 inches from an edge of the notch fillet radius and a maximum depth of about 0.1 inches from the edge of the notch fillet radius;
- removing a hardface structure positioned proximate the damaged notch fillet radius;
- forming a replacement notch fillet radius with weld filler; and
- welding a hardface nugget to at least a portion of the replacement notch fillet radius.

9. The method of claim 8, wherein the welding the hardface nugget comprises gas tungsten arc welding.

10. The method of claim 8, wherein the welding the hardface nugget comprises welding at a power of between about 10 amps and about 25 amps.

11. The method of claim 8, wherein the forming the replacement notch fillet radius with the weld filler comprises using a nickel-based alloy.

12. The method of claim 11, wherein the nickel-based alloy comprises Inconel-625.

13. The method of claim 8, further comprising:
- preparing the replacement notch fillet radius for the hardface nugget prior to the welding step.

14. The method of claim 13, wherein the preparing the replacement notch fillet radius for the hardface nugget comprises shaping the replacement notch fillet radius to accept the hardface nugget.

* * * * *

UNITED STATES PATENT AND TRADEMARK OFFICE
CERTIFICATE OF CORRECTION

| | | |
|---|---|---|
| PATENT NO. | : 7,934,315 B2 | Page 1 of 1 |
| APPLICATION NO. | : 11/503325 | |
| DATED | : May 3, 2011 | |
| INVENTOR(S) | : Timothy A. Milleville | |

It is certified that error appears in the above-identified patent and that said Letters Patent is hereby corrected as shown below:

Col. 4, Line 64
Delete the first instance of the word "preparing"

Signed and Sealed this
Twenty-first Day of June, 2011

David J. Kappos
*Director of the United States Patent and Trademark Office*